United States Patent [19]

Okada

[11] Patent Number: 4,868,787

[45] Date of Patent: Sep. 19, 1989

[54] WAVELENGTH SELECTIVE OPTICAL DATA STORAGE SYSTEM

[75] Inventor: Kazuo Okada, Amagasaki, Japan

[73] Assignee: Mitsubishi Denki Kabushiki Kaisha, Tokyo, Japan

[21] Appl. No.: 167,109

[22] Filed: Mar. 11, 1988

[30] Foreign Application Priority Data

Apr. 15, 1987 [JP] Japan .................................. 62-93537

[51] Int. Cl.⁴ ............................................. G11C 13/04
[52] U.S. Cl. .................................... 365/106; 369/109; 369/100; 369/102; 346/76 L; 346/135.1
[58] Field of Search ............... 365/106, 119, 120, 123; 369/100, 102, 109, 121, 112; 346/76 L, 135.1

[56] References Cited

U.S. PATENT DOCUMENTS 4,101,976  7/1978  Castro et al. ........................ 365/119
4,689,781  8/1987  Ando .................................. 369/112

FOREIGN PATENT DOCUMENTS 58-51355  11/1983  Japan .

Primary Examiner—Robert L. Richardson
Attorney, Agent, or Firm—Fleit, Jacobson, Cohn, Price, Holman & Stern

[57]     ABSTRACT

A first memory element and a second memory element have characteristics of wavelength selective optical data storage. Information is recorded on the first memory element by creating recording holes by a narrow band light beam at specific wavelength positions within a broad inhomogenous absorption line. The second element has at least one prerecorded hole at a specific wavelength position thereof for detecting the wavelength positions of the recording holes.

12 Claims, 4 Drawing Sheets

WAVELENGTH SELECTIVE OPTICAL DATA STORAGE SYSTEM

BACKGROUND OF THE INVENTION

This invention relates to a wavelength selective optical data storage system.

FIG. 1 shows a wavelength selective optical data storage system and FIGS. 2A, 2B and 2C show the wavelength spectra of a recording medium, which were proposed previously in the Japanese Patent Publication No. 51355/1983. A diverging beam emitted from light source 10 is collimated by collimator lens 12. The parallel beam from lens 12 passes through optical deflector 13 and is focused by objective lens 14 on memory element 16 of recording medium 15 which has a function of wavelength (frequency) selective optical data storage, which exhibits inhomogeneous absorption line broadening and undergoes a photo induced reaction upon exposure to light. One of elements 16 is selected by deflecting the beam through deflector 13. The beam transmitted through element 16 is detected by photodetector 17.

The principle of wavelength selective optical data storage is described below with reference to FIGS. 2A. 2B and 2C, FIG. 2A shows absorption spectrum (inhomogeneous absorption line broadening) of element 16 on which no recording is made. It is understood from FIG. 2A that the light beam, such as a laser with broad range of wavelength is absorbed by element 16. When the beam of specific wavelength with intensity spectrum as shown by the dotted line in FIG. 2A is incident on element $16_1$ a hole is created or burned at the corresponding wavelength position on absorption spectrum as shown in FIG. 2B. The hole means that a data bit "1" is recorded on the wavelength and therefore a data bit "0" is expressed with the non-hole portion. Data bits are stored by selective photo induced reactions induced by a narrow band light beam at specific wavelength positions within the broad inhomogeneous line.

Any hole can be created, in other words a data bit "1" can be recorded, by adjusting the wavelength of light source 10 to that of the recording hole and making the light intensity high at the level necessary for recording.

The beam emitted from source 10 is scanned or tuned with respect to wavelength by wavelength controller 11 in a recording wavelength band of an upper limit A to a lower limit B with a constant intensity to reproduce the recorded data. Since the absorptive power of the element is lowered at the wavelength of the recording hole as shown in FIG. 2B, the output of photodetector 17 has the spectrum as shown in FIG. 2C. Although FIG. 2C shows a wavelength spectrum, photodetector 17 outputs a time series signal corresponding to the spectrum when the wavelength is scanned at a constant rate.

A problem of known wavelength selective optical data storage system is identification of the positions of recording holes on the spectrum at the time of recording and reproducing. Thousands of recording holes can be created within the broad range of spectrum of FIG. 2A. This means that information of thousands of bits can be recorded. It is necessary, however, to control precisely the absolute wavelength of source 10. The wavelength width of a hole is typically in a range of tens to hundreds of MHz in frequency and it is very difficult to adjust the wavelength of the optical beam to the extent of the above-mentioned value. Even if the wavelength of the beam is adjusted to a predetermined value, the hole position will shift on the spectrum of recording medium 15 when the spectrum characteristic has slightly changed because of temperature variations or aging changes. In this case, rewriting may be made accidentally.

Also this is a problem at the time of reproducing. Namely, although a signal as shown in FIG. 2C is reproduced by scanning the wavelength of light source 10, it is difficult to identify the orders of the holes on the spectrum of the reproduced signal.

SUMMARY OF THE INVENTION

An object of the invention is to solve the problems stated above.

Another object of the invention is to provide an apparatus which is able to identify the wavelength positions of holes to be recorded without measuring the absolute wavelength, and the orders of reproduced holes in spite of temperature variations or aging changes.

According to the invention, there is provided a wavelength selective optical data storage system comprising a light source emitting a light beam with a variable wavelength, a beam dividing means dividing the beam emitted from the source into a main beam and a sub-beam, a first memory element having a characteristic of wavelength selective optical data storage on which information is recorded by creating at least one recording hole by the narrow band light beam at a specific wavelength position within a broad inhomogeneous absorption line, a second memory element having a characteristic of wavelength, selective optical data storage on which at least one prerecorded hole is created in advance at a specific wavelength position within a broad inhomogeneous absorption line, an optical guiding means guiding the main beam and the sub-beam so that they are incident on the first memory element and the second memory element, respectively, a first photodetector detecting the main beam transmitted through or reflected by the first memory element, a second photodetector detecting the sub-beam transmitted through or reflected by the second memory element, and a wavelength position detecting means detecting the wavelength position of the recording hole to be recorded or reproduced on the first memory element from the output of the second photodetector.

In this way, because there is provided the second memory element in addition to the first memory element, it is possible to record and reproduce information with high reliabiliity without knowing absolute wavelength accurately.

DETAILED DESCRIPTION OF THE PREFERRED EMBODIMENTS

Figure 1:
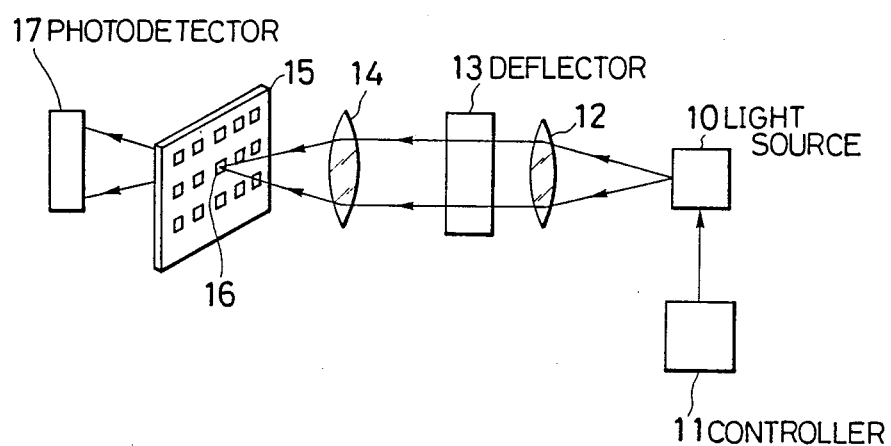
FIG. 1 is a schematic diagram of a wavelength selective optical data storage system of the prior art.
Figure 2A:
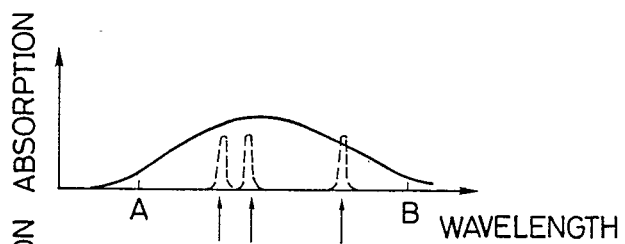
FIG. 2A, 2B and 2C are explanatory diagrams explaining the principle of the system shown in FIG. 1.
Figure 2B:
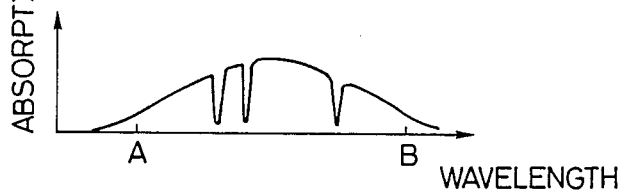
Figure 2C:
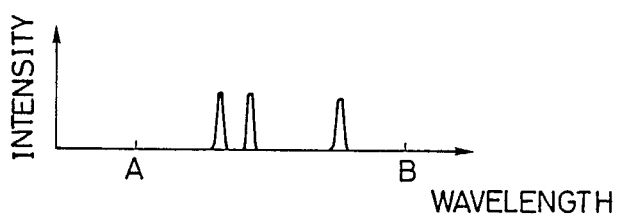
Figure 3:
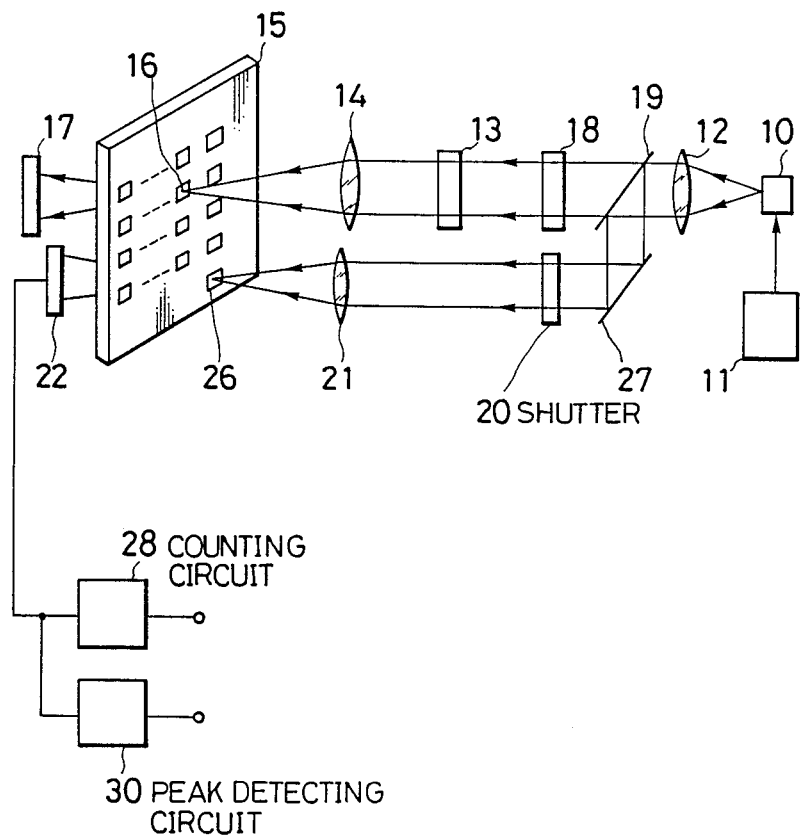
FIG. 3 is a schematic diagram showing a wavelength selective optical data storage system according to the invention.

An embodiment of the invention is described below with reference to the accompanying drawings. In FIG. 3, reference numerals 10 to 17 designate the same elements as in FIG. 1. Reference numeral 18 designates a shutter controlling intensity of a main beam, 19 is a half mirror dividing the beam from source 10 into the main beam and a sub-beam, and 20 is a shutter controlling intensity of the sub-beam. Reference numeral 21 is an objective lens, 22 is a photodetector detecting the sub-beam transmitted through a counting memory element 26 formed at a predetermined position on the medium 15 with a characteristic of wavelength selective optical data storage, 28 designates a counting circuit producing pulses from output of photodetector 22 and counting them, and 30 is a peak detecting circuit producing pulses from output of photodetector 22 and detecting peak positions of the pulses.

Figure 4A:
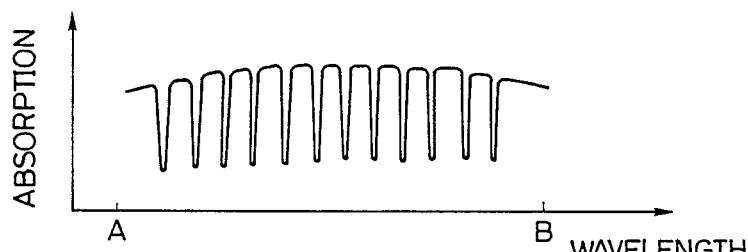
FIG. 4A, 4B and 4C are explanatory diagrams explaining the principle of the embodiment shown in FIG. 3.

Since the sub-beam is divided before being applied to deflector 13, it is always focused on one counting memory element 26 in spite of selection of memory element 16 by reflecting the main beam through deflector 13. On counting memory element 26, prerecorded holes are created in advance at all wavelength positions to be recorded on spectrum of the inhomogeneous absorption line broadening thereof as shown in FIG. 4A.

Figure 4B:
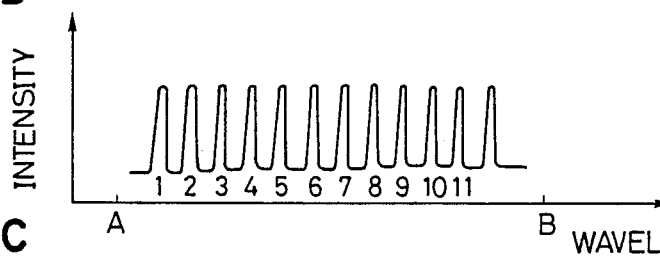

This system operates as follows. In FIG. 3, the main beam, divided from the beam of source 10 by mirror 19 and transmitted through shutter 18, is deflected and focused by deflector 13 and objective lens 14, respectively, onto one of memory elements 16. The main beam transmitted through element 16 is detected by photodetector 17. At the same time, the sub-beam divided by mirror 19 is transmitted through shutter 20 and focused on element 26 by objective lens 21. The sub-beam transmitted through element 26 is detected by photodetector 22. Since element 26 has absorption spectrum shown in FIG. 4A as mentioned above, when the wavelength of the beam is scanned or tuned by controller 11, the spectrum of the beam transmitted through element 26 becomes as shown in FIG. 4B, and therefore, photodetector 22 outputs a pulse train in accordance with the spectrum during wavelength scanning. The pulses are counted by counting circuit 28. Because the count values show wavelength positions of holes, shutter 18 or source 10 is controlled in accordance with the count values. Namely, data recording hole is created by opening shutter 18 or making intensity of the beam high when the output of counting circuit 28 indicates that the wavelength of light is at the position where the hole is to be recorded.

Also shutter 18 or source 10 is controllable by output of peak detecting circuit 30 which detects the peak positions of the pulses outputted from photodetector 22. Since more precise positions are detected by peak detecting circuit 30, the wavelength positions of the holes on each element 16 can be more precisely synchronized with that on element 26. At the time of recording data on element 16, shutter 20 is closed, so that the sub-beam with high intensity is prevented from being incident on element 26. It is also possible to keep the prerecorded holes on element 26 from being destroyed by adjusting dividing ratio of mirror 19.

Thus the wavelength positions of holes are identified from output of circuit 28 or 30. Therefore, it is possible not only to record information from the first hole in sequence but also to write one bit data on one hole at a desired position. The writing wavelength can be precisely selected by adjusting the writing timing to the peak positions of pulses corresponding to the prerecorded holes. Therefore, new data is prevented from being rewritten on old data by mistake or at a position far from a proper position because of absorption wavelength shift due to the temperature variation of the medium. Even if the spectrum position of information recording memory element changes because of temperature variations or aging factors, because the counting and recording memory elements are the same in material, the spectrum shift occurs in the counting memory element by the same amount as in the recording memory element. Accordingly, the wavelength change is compensated automatically by recording information in synchronism with output from the counting memory element.

Figure 4C:
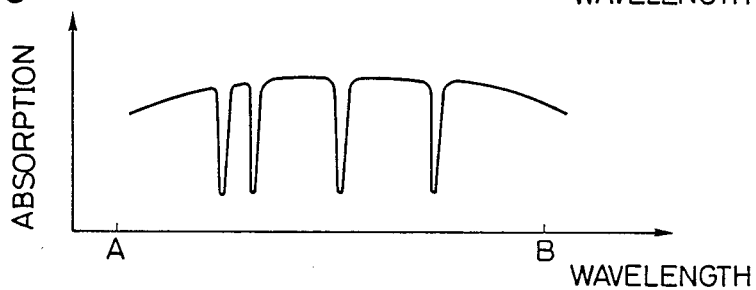

Also the prerecorded holes are detected at the time of reproduction in the same way as at the time of recording mentioned above. At the time of reproducing information recorded on element 16 as shown in FIG. 4C, photodetector 17 outputs reproduced pulses at the wavelength positions corresponding to the count values or numbers 3, 4, 7 and 10 of counting circuit 28 which counts pulses as shown in FIG. 4B. Namely these count numbers of circuit 28 indicate the wavelength positions of recording holes which are detected by photodetector 17. Accordingly the recorded information is precisely read out from the outputs of photodetector 17 and circuit 28. If necessary, the output of photodetector 17 can be read in synchronism with the output of photodetector 22, and thereby more precise reading is possible.

Figure 5:
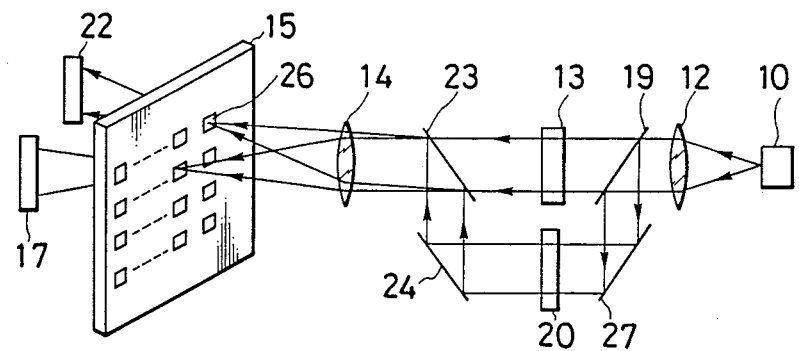
FIG. 5 is a schematic diagram of a second embodiment of the invention.

FIG. 5 shows another embodiment of the invention. As shown in FIG. 5, the sub-beam divided by half mirror 19 and reflected by mirrors 27 and 24 can be superimposed again onto the main beam by half mirror 23 and be focused by objective lens 14 on element 26, so objective lens 21 in FIG. 3 can thereby be eliminated. Element 26 can be freely selected at any position by adjusting the angle of mirrors 23 and 24.

Figure 6:
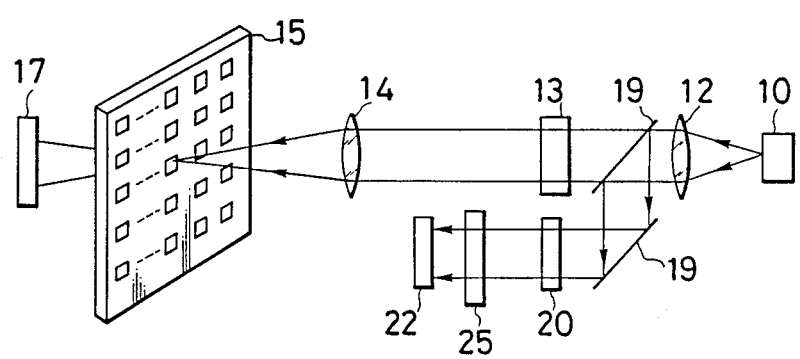
FIG. 6 is a schematic diagram of a third embodiment of the invention.

FIG. 6 shows the third embodiment of the invention. In this embodiment there is provided a separate memory medium 25 which is positioned in the path of the sub-beam and on which element 26 is formed. Although it is preferable that medium 25 with element 26 has the same characteristic as the medium 15 with element 16, medium 25(element 26) can have a characteristic different from that of medium 15(element 16), because it is not necessarily demanded for the absolute wavelength position on medium 25 to be exactly equal to that on medium 15.

In the embodiments described above, the prerecorded holes are created at all wavelength positions on which the recording holes can be formed. However, these can be formed only at part of them at constant or varying intervals. In this case, when the wavelength is scanned at a constant rate, an internal timing signal having pulses corresponding to all the hole positions which can be recorded or reproduced can be produced by use of an oscillator, whose frequency corresponds to the frequency of pulses that would be produced if the holes were created at all wavelength positions. The internal timing signal can be synchronized with the pulses produced from the prerecorded holes.

Where the scanning rate is kept constant enough, provision of one or a few prerecorded holes at the beginning of wavelength scanning range (recording wavelength board) may suffice for synchronization of the internal timing signal: recording and reproducing can be performed using an internal timing signal that is synchronized with the pulses produced from the prerecorded holes.

Although media 15 and 25 are formed in configuration of a rectangle and fixed at a predetermined position in the embodiments described above, these can be rotating disk-like medium, portable card-like medium, or medium in any other configuration. Where the medium is made in disk-like configuration, the counting memory element may be formed circularly at a predetermined radius position.

Also the invention can be applied to reflective type medium which has a reflective film inserted between a substrate and a recording layer having a characteristic of wavelength selective optical data storage.

What is claimed is:

1. A wavelength selective optical data storage system comprising:
    a light source emitting a light beam with a variable wavelength,
    a beam dividing means for dividing the beam emitted from the source into a main beam and a sub-beam,
    a first memory element having a characteristic of wavelength selective optical data storage on which information is recorded by at least one recording hole by an incident narrow band light beam at a specific wavelength position within a broad inhomogeneous absorption line,
    a second memory element having a characteristic of wavelength selective optical data storage on which at least one prerecorded hole is created in advance at a specific wavelength position within a broad inhomogeneous absorption line,
    an optical guiding means guiding the main beam and the sub-beam so that they are incident on the first memory element and the second memory element, respectively,
    a first photodetector detecting the main beam transmitted through or reflected by the first memory element,
    a second photodetector detecting the sub-beam transmitted through or reflected by the second memory element, and
    a wavelength position detecting means detecting the wavelength position of the recording hole to be recorded or reproduced on the first memory element from the output of the second photodetector.

2. A wavelength selective optical data storage system according to claim 1,
    wherein the wavelength position detecting means detects the wavelength position by counting pulses produced as output from the second photodetector.

3. A wavelength selective optical data storage system according to claim 1,
    wherein the wavelength position detecting means detects the wavelength position by detecting peak positions of pulses produced as output from the second photodetector.

4. A wavelength selective optical data storage system according to claim 1,
    wherein in the second memory element the prerecorded holes are created at all wavelength positions corresponding to that on which the recording holes can be formed.

5. A wavelength selective optical data storage system according to claim 1,
    wherein in the second memory element at least one prerecorded hole is created at part of the wavelength positions corresponding to that on which the recording holes can be formed.

6. A wavelength selective optical data storage system according to claim 1,
    wherein said wavelength position detecting means includes an oscillator and wherein at least one prerecorded hole is created at the beginning of the broad inhomogeneous absorption line in the second memory element and the wavelength position is detected by referring to an internal timing signal which is generated in synchronism with the prerecorded hole by said oscillator of the wavelength position detecting means.

7. A wavelength selective optical data storage system according to claim 1,
    wherein the first memory element and the second memory element are formed on the same medium.

8. A wavelength selective optical data storage system according to claim 1,
    wherein the first memory element and the second memory element are formed on different media.

9. A wavelength selective optical data storage system according to claim 1,
    wherein the characteristic of wavelength selective optical data storage of the first memory element differs from that of the second memory element.

10. A wavelength selective optical data storage system according to claim 1,
    wherein the second memory element has the same wavelength selective optical data storage characteristic as the first memory element.

11. A wavelength selective optical data storage system according to claim 1,
    wherein the first memory element is formed on a disk-like or card-like medium.

12. A wavelength selective optical data storage system according to claim 1,
    wherein at least the first memory element or the second memory element is formed on a medium which has a reflective film reflecting the main beam or the sub-beam.

* * * * *